United States Patent
Ward et al.

(10) Patent No.: US 11,269,647 B2
(45) Date of Patent: Mar. 8, 2022

(54) FINISH STATUS REPORTING FOR A SIMULTANEOUS MULTITHREADING PROCESSOR USING AN INSTRUCTION COMPLETION TABLE

(71) Applicant: International Business Machines Corporation, Armonk, NY (US)

(72) Inventors: Kenneth L. Ward, Austin, TX (US); Susan E. Eisen, Round Rock, TX (US); Dung Q. Nguyen, Austin, TX (US); Glenn O. Kincaid, Austin, TX (US); Christopher M. Mueller, Round Rock, TX (US); Tu-An T. Nguyen, Austin, TX (US); Gaurav Mittal, Round Rock, TX (US); Deepak K. Singh, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 321 days.

(21) Appl. No.: 15/845,871

(22) Filed: Dec. 18, 2017

(65) Prior Publication Data
US 2019/0187993 A1    Jun. 20, 2019

(51) Int. Cl.
*G06F 9/30*    (2018.01)
*G06F 9/38*    (2018.01)

(52) U.S. Cl.
CPC ........ *G06F 9/3851* (2013.01); *G06F 9/30145* (2013.01)

(58) Field of Classification Search
CPC combination set(s) only.
See application file for complete search history.

(56) References Cited

U.S. PATENT DOCUMENTS

| | | | |
|---|---|---|---|
| 6,077,306 A | 6/2000 | Metzger et al. | |
| 6,694,427 B1 * | 2/2004 | Mericas | G06F 9/3802 712/227 |
| 7,051,190 B2 * | 5/2006 | Samra | G06F 9/3017 712/210 |
| 2011/0264897 A1 * | 10/2011 | Henry | G06F 9/30007 712/226 |
| 2016/0092276 A1 | 3/2016 | Chu et al. | |
| 2016/0105530 A1 | 4/2016 | Shribman et al. | |

* cited by examiner

*Primary Examiner* — Corey S Faherty
(74) *Attorney, Agent, or Firm* — Patterson + Sheridan, LLP (57) ABSTRACT

A simultaneous multithreading processor and related method of operating are disclosed. The method comprises dispatching portions of a first instruction to be executed by a respective plurality of execution units of the processor; receiving, at an instruction completion table of the processor, respective finish reports responsive to execution of the portions of the first instruction; determining, using the received finish reports, that all of the portions of the first instruction have been executed; and updating the instruction completion table to indicate that the first instruction is ready for completion.

20 Claims, 4 Drawing Sheets

FINISH STATUS REPORTING FOR A SIMULTANEOUS MULTITHREADING PROCESSOR USING AN INSTRUCTION COMPLETION TABLE

BACKGROUND

Embodiments presented herein generally relate to executing instructions in a processor, and more specifically, to finish status reporting for a simultaneous multithreading processor using an instruction completion table.

A conventional superscalar processor may issue instructions out-of-order with respect to a predefined program order. Because subsequent instructions are often dependent upon results of previous instructions, an issue queue in the processor may use a dependency tracking scheme to ensure that all data dependencies are followed. For instance, in one approach, the processor manages dependencies using instruction tags. At issue of an instruction in a given clock cycle to a given execution unit, the processor associates the instruction with an instruction tag that uniquely identifies the instruction within the processor. Further, during the same cycle, an execution unit may broadcast the instruction tag to the issue queue. Doing so may wake up one or more instructions that are dependent on the associated instruction (i.e., indicates that source operands for the dependent instructions are ready) and prepares the instructions for subsequent issue.

Simultaneous multithreading (SMT) allows various core resources of a processor to be shared by a plurality of instruction streams known as "threads." Core resources can include instruction-execution units, caches, translation-lookaside buffers (TLBs), and the like, which may be collectively referred to generally as a processor core (or "core"). In conventional processor design, a single instruction is executed using a single execution unit, and the single execution unit returns or reports a finish status of the instruction to completion logic. However, in an SMT environment, a single instruction may be executed using multiple execution units that independently execute respective portions of the instruction.

SUMMARY

According to one embodiment, a method of operating a processor comprises dispatching portions of a first instruction to be executed by a respective plurality of execution units of the processor; receiving, at an instruction completion table of the processor, respective finish reports responsive to execution of the portions of the first instruction; determining, using the received finish reports, that all of the portions of the first instruction have been executed; and updating the instruction completion table to indicate that the first instruction is ready for completion.

According to another embodiment, a simultaneous multithreading processor is disclosed for executing a plurality of threads corresponding to a plurality of instructions. The simultaneous multithreading processor comprises a plurality of execution units; a dispatch unit configured to dispatch portions of a first instruction to be executed by the plurality of execution units, the first instruction selected from the plurality of instructions; and an instruction completion table for tracking a status of the plurality of instructions during out-of-order processing. The instruction completion table is configured to receive respective finish reports responsive to execution of the portions of the first instruction; determine, using the received finish reports, that all of the portions of the first instruction have been executed; and update to indicate that the first instruction is ready for completion.

According to yet another embodiment, a method is disclosed of operating a processor comprising a plurality of execution units. The method comprises receiving one or more finish reports responsive to execution of portions of a plurality of instructions by the plurality of execution units; updating, using the finish reports, finish information of an instruction completion table of the processor, the finish information corresponding to one or more instructions of the plurality of instructions; and updating, responsive to updating the finish information, the instruction completion table to indicate that at least a first instruction of the plurality of instructions is ready for completion.

DETAILED DESCRIPTION

The descriptions of the various embodiments of the present disclosure are presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, any reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

Figure 1:
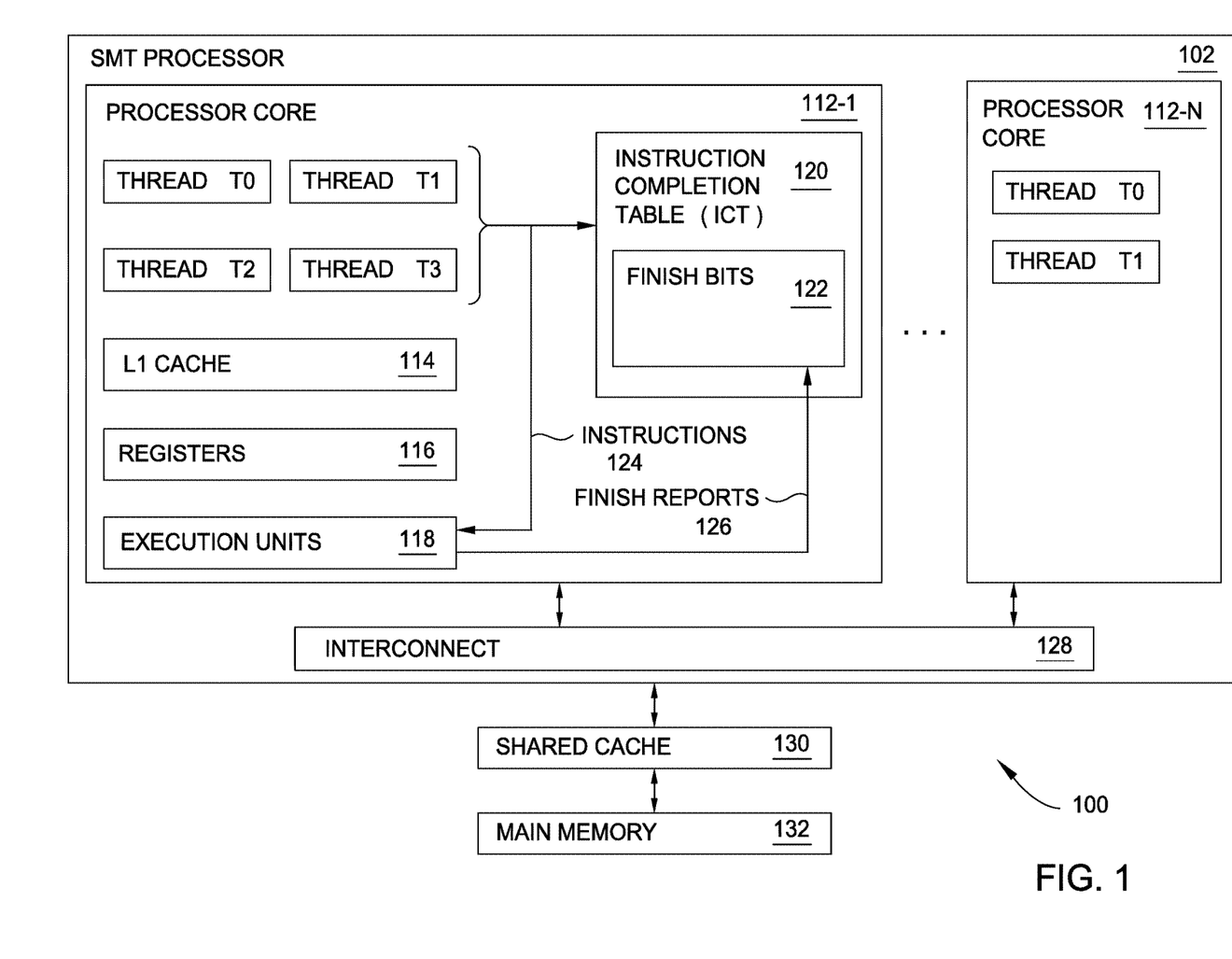
FIG. 1 illustrates an exemplary SMT multicore environment, according to embodiments described herein.

FIG. 1 illustrates an exemplary SMT multicore environment 100 according to an embodiment. The SMT multicore environment 100 can include multiple instances of an SMT processor 102 (or processor 102). As shown, a plurality of processor cores 112-1 to 112-N (generally referred to as processor cores 112) are included on one SMT processor die or SMT processor 102, and the plurality of processor cores 112-1 to 112-N is interconnected with an interconnect 128 under management of an interconnect control (not shown). Each processor core 112 may have an instruction cache for caching instructions 124 from memory to be executed and a data cache for caching data (operands) of memory locations to be operated on by the processor core 112. In one embodiment, caches of multiple SMT processors 102 may be interconnected to support cache coherency between the caches of the multiple SMT processors 102. The processor core 112 caches may include one level of caching in a hierarchical cache structure. For example, each SMT processor 102 may employ a shared cache 130 to be shared among all or a subset of the processor cores 112 on the SMT processor 102, where the shared cache 130 is arranged between the SMT processor 102 and a main memory 132. Additionally, each processor core 112 may have its own level 1 (L1) cache 114 directly on the processor core 112, where the L1 cache 114 is not shared among the different processor cores 112 but is a core-internal cache. Also, each processor core 112 may have one or more registers 116 for storing small amounts of data, status, and/or configuration information.

It is understood that the processor cores 112 may be physical devices that include all of the circuitry (i.e., hardware and/or firmware) necessary to execute instructions 124 as understood by one skilled in the art. Although the SMT processor 102 may include multiple processor cores 112, various examples may be provided with reference to processor core 112-1 for ease of understanding and not limitation. It is understood that further details shown and discussed relative to processor core 112-1 apply by analogy to all processor cores 112, and these details may be included in all of the processor cores 112.

The processor core 112-1 is shown with four threads T0, T1, T2, and T3 configured to execute a plurality of instructions 124. More specifically, each thread T0, T1, T2, and T3 includes a separate sequence of instructions or instruction stream of the plurality of instructions 124, such as a program or a portion thereof. Each processor core 112-1 to 112-N may be configured to support different levels of SMT, where a level corresponds to a particular number of threads. In the example of FIG. 1, the processor core 112-1 is in an SMT-4 mode, meaning that four threads T0, T1, T2, and T3 are configured to execute in parallel, while the processor core 112-N is in an SMT-2 mode with threads T0 and T1. A processor core 112 may be configured in a single thread mode or a higher order mode with a higher number of threads depending upon implementation.

At an architecture level, each thread T0, T1, T2, and T3 may represent an independent central processing unit (CPU). Instructions 124 that the threads T0, T1, T2, and T3 have for execution by the processor core 112 can include a number of instruction classes, such as: general, decimal, floating-point-support (FPS), binary-floating-point (BFP), decimal-floating-point (DFP), hexadecimal-floating-point (HFP), control, and I/O instructions. The general instructions can be used in performing binary-integer arithmetic operations and logical, branching, and other non-arithmetic operations. The decimal instructions operate on data in decimal format. The BFP, DFP, and HFP instructions operate on data in BFP, DFP, and HFP formats, respectively, while the FPS instructions operate on floating-point data independent of the format or convert from one format to another. To achieve higher throughput, various resource units of each processor core 112 are accessed in parallel by executing one or more of the instructions 124 in a thread T0, T1, T2, and T3 using a processing pipeline and through out-of-sequence execution as described with further reference to FIG. 2.

Each processor core 112 comprises a plurality of execution units 118 (which may also referred to as "slices") of any suitable type(s). For example, the plurality of execution units 118 may comprise one or more fixed-point execution units, one or more floating-point execution units, one or more load/store execution units, and/or one or more vector execution units. In some SMT implementations, portions of the instructions 124 are transmitted to different ones of the plurality of execution units 118 for execution. This may include portions of the instructions 124 from different threads T0, T1, T2, T3. As the execution of the different portions may be performed out-of-order, in some embodiments, the processor core 112 comprises an instruction completion table (ICT) 120 for tracking a status of the plurality of instructions 124, e.g., during out-of-order processing. The ICT 120 comprises a predefined data structure configured to store various information regarding processing the instructions 124, such as information for completion and/or flushing of the instructions 124, and exception trouble code information indicating whether special handling is required for individual instructions 124. In some embodiments, the ICT 120 comprises a plurality of finish bits 122 that indicate which instructions 124 have been executed and are ready for completion processing.

While described as a table, the ICT 120 may also encompass logic related to updating the ICT 120 and communicating with other elements of the processor core 112. In some embodiments, the execution units 118 transmit finish reports 126 to the ICT 120, and the plurality of finish bits 122 are updated responsive to the finish reports 126. In some embodiments, the ICT 120 is further configured to transmit information from the finish bits 122, e.g., to completion logic (not shown) of the processor core 112. The processor core 112 may use the finish bits 122 to sequence instructions for completion. In some embodiments, the processor core 112 determines, using at least the finish bits 122, an oldest instruction that is ready for completion, and transmits the oldest instruction for completion. Additional features of the ICT 120 are described below with respect to FIG. 3.

Although not shown, the processor core 112 may be further configured to determine whether any of the threads T0, T1, T2, and T3 are hung (stated another way, a forward progress of the thread has stalled). The processor core 112 may transmit information identifying a hung thread to update the ICT 120. Hang detection logic included in the processor core 112 may have any suitable implementation, such as a timer configured to determine whether an instruction of the thread T0, T1, T2, T3 has been completed or flushed within a predefined amount of time. For example, a timer of the hang detection logic may be programmable to correspond to a desired number of cycles of the processor core 112, and the timer may be reset upon completion or flush of a previous instruction.

Figure 2:
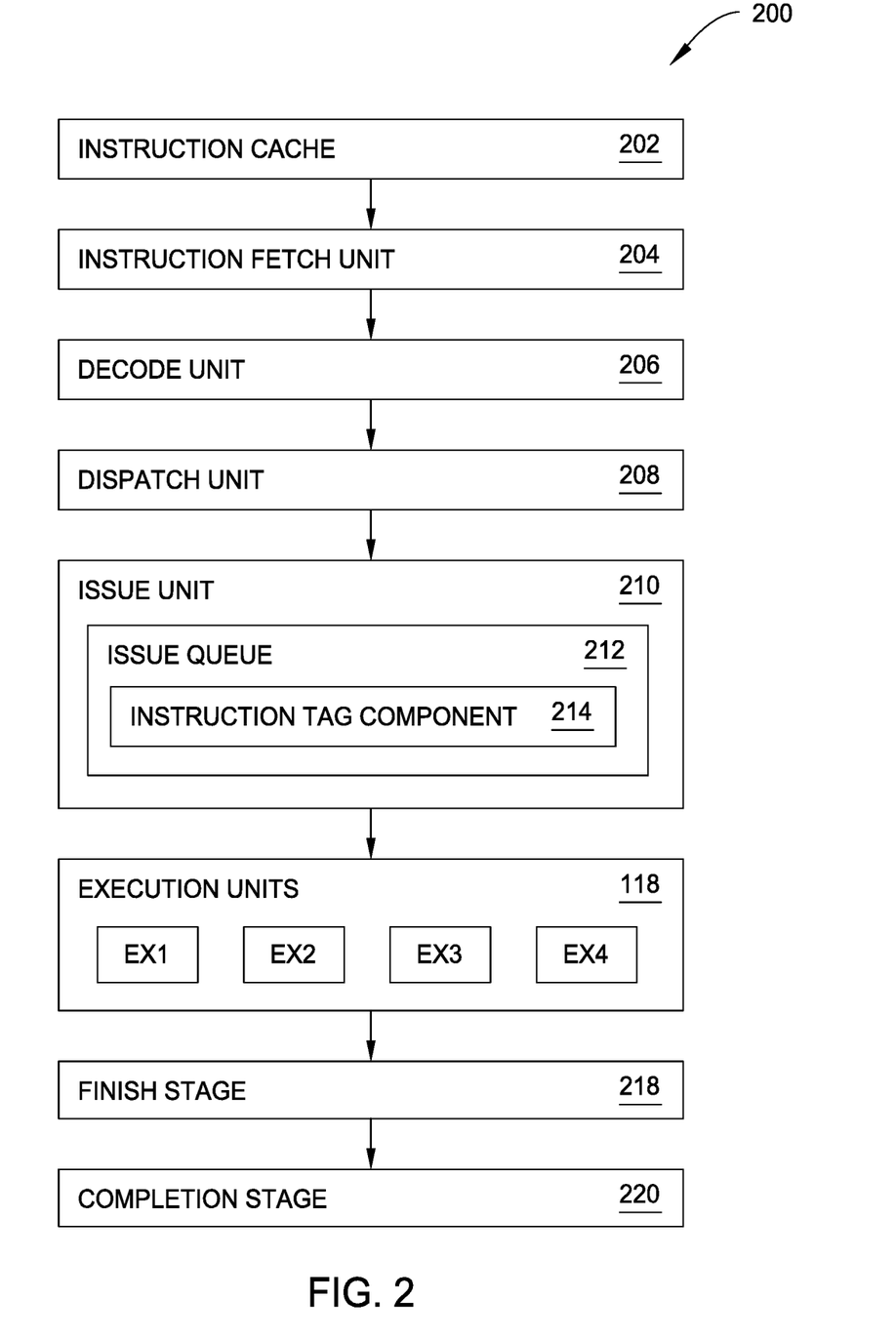
FIG. 2 illustrates a portion of an exemplary processing pipeline of a processor core, according to embodiments described herein.

FIG. 2 illustrates a portion of an exemplary processing pipeline 200 of a processor core, such as the processor core 112. An instruction cache 202 may hold a sequence of instructions for one or more of the threads T0, T1, T2, and T3. An instruction fetch unit 204 may fetch instructions from the instruction cache 202 and provide the fetched instructions to a decode unit 206. The decode unit 206 can decode the instructions and form groups of instructions to be dispatched by a dispatch unit 208. The groups of instructions may be tracked in a predefined storage structure, such as the ICT 120, as further described herein. The processing pipeline 200 may include out-of-order processing that can be performed on groups of instructions, such as issuing the instructions out-of-order using an issue unit 210. In some embodiments, the dispatch unit 208 divides the instructions into portions that may be executed by selected one(s) of the plurality of execution units 118. The issue unit 210 analyzes the instructions or other data and transmits the decoded instructions, portions of instructions, or other data to execution units EX1, EX2, EX3, EX4 of the plurality of execution units 118 in an execution stage based on the analysis. The execution units EX1, EX2, EX3, and/or EX4 execute the instructions. As discussed above, the execution units EX1, EX2, EX3, EX4 may be of any suitable type. Although four execution units EX1, EX2, EX3, EX4 are shown, the plurality of execution units 118 may include any other suitable number of execution units.

As shown, the issue unit 210 includes an issue queue 212 that includes an instruction data store that stores issue queue instructions. For example, an issue queue 212 that stores twenty-four instructions uses an instruction data store with twenty-four storage locations. The issue queue 212 may include an age array that tracks relative age data for each instruction within the instruction data store. The issue queue 212 may also include instruction select logic that determines which of the stored instructions to issue at a given clock cycle. For example, the instruction selection logic may prioritize older instructions that have been previously rejected (e.g., due to collisions with other issuing instructions) to issue over younger instructions in the issue queue 212.

In one embodiment, the issue queue 212 includes an instruction tag component 214. At issue of a given instruction during a clock cycle, the instruction tag component 214 associates an instruction tag with that instruction. The instruction tag uniquely identifies the instruction within the SMT processor 102. The plurality of execution units 118 may broadcast the instruction tag to other consuming facilities of the SMT processor 102. For example, the execution units 118 may broadcast the instruction tag to instructions that are stored in the issue queue 212. In turn, the instruction tag may be analyzed to determine any dependencies of the corresponding instruction to the instructions included in the issue queue 212. If an instruction of the issue queue 212 is dependent on the instruction corresponding to the instruction tag, the instruction "wakes up" for potential subsequent issue. As another example, the execution unit 118 may broadcast the instruction tag to completion logic of the SMT processor 102 to indicate that the underlying instruction has finished execution.

As clock cycle latency can vary between instructions that are stored in the issue queue 212, and because multiple execution units 118 may broadcast instruction tags during each clock cycle, managing instruction tags presents several challenges (e.g., in minimizing power consumption, silicon usage, etc.). To address these challenges, in one embodiment, the processor core 112 may include a latency pipe that manages the instruction tags of issued instructions.

Within the processing pipeline 200, a finish stage 218 can track finishing execution of individual instructions of the groups of instructions. Once all instructions in a group of instructions finishes execution, the group of instructions completes in program order such that older groups in a sequence of instructions complete before a younger group of instructions, as managed by completion stage 220. Upon completion, the completion stage 220 can provide results and instruction information for checkpointing at a checkpoint stage (not shown), as well as release group management resources for reuse. The checkpoint stage 220 can store information to establish a recovery state, such as a next instruction address to execute and various register status values after completion.

The processing pipeline 200 may include other features, such as error checking and handling logic and/or other features known in the art. In one embodiment, the processing pipeline 200 further comprises write-back logic configured to write results of instruction execution back to a destination resource. The destination resource may be any type of resource, including registers, cache memory, other memory, I/O circuitry to communicate with other devices, other processing circuits, or any other type of destination for executed instructions or data. In one embodiment, the processing pipeline includes one or more parallel paths, which may enable multiple threads or multiple instruction groups of a same thread to be executed simultaneously. While a forward path through the processing pipeline 200 is illustrated in FIG. 2, other feedback and signaling paths may be included between elements of the processing pipeline 200.

Figure 3:
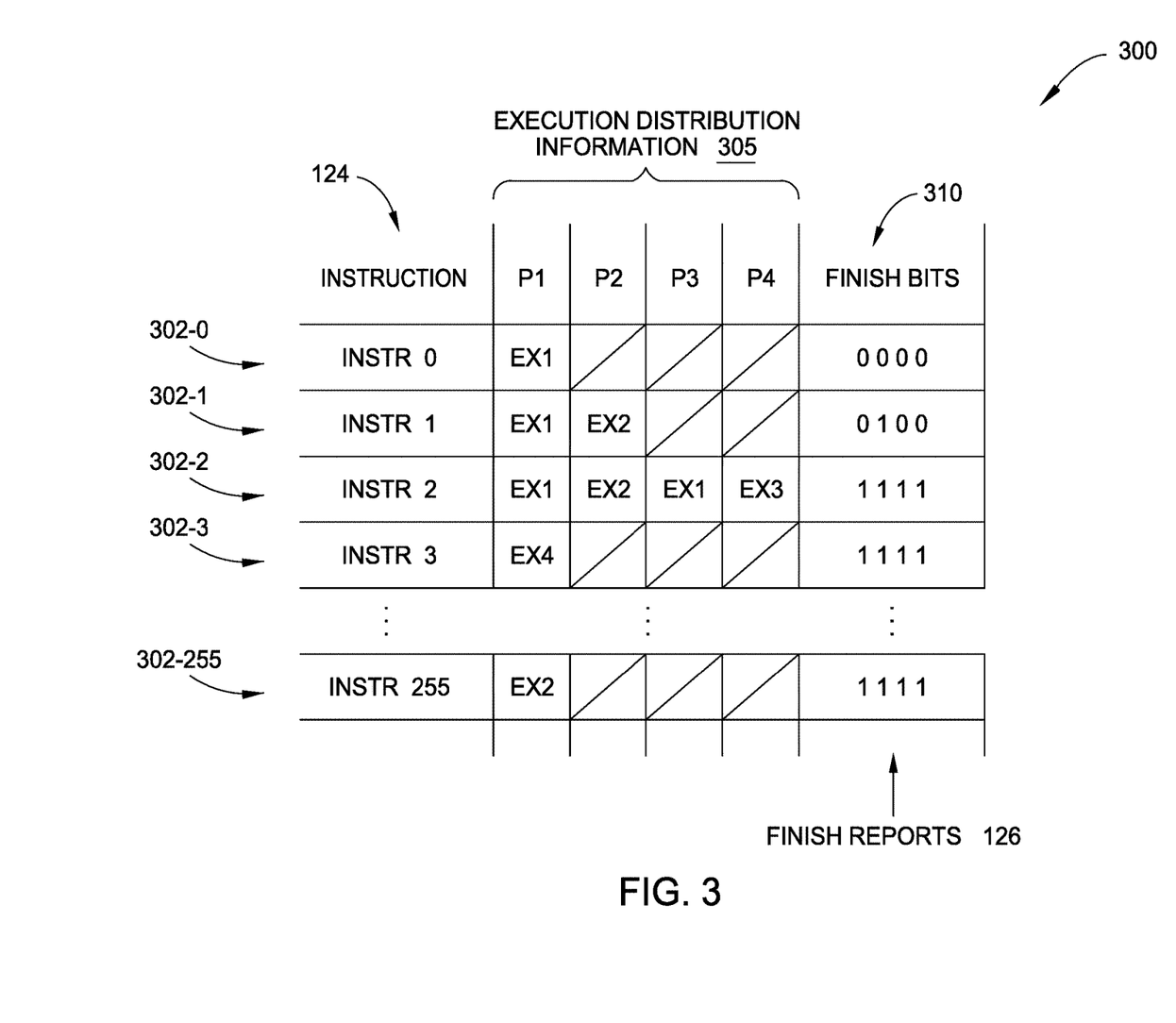
FIG. 3 illustrates an exemplary instruction completion table in a processor, according to embodiments described herein.

FIG. 3 illustrates an exemplary instruction completion table 120 in a processor, according to embodiments described herein. As discussed above, the ICT 120 is generally configured to track the progress of all instructions 124 in the processor core 112 even while being processed out-of-order (e.g., in a SMT multicore environment 100). For example, the ICT 120 may track the progress of instructions after being dispatched until the instruction is completed (or flushed).

In diagram 300, the ICT 120 comprises a plurality of entries 302-0, 302-1, 302-2, ... , 302-255 (generically referred to as an entry 302). While shown as having 256 entries, the ICT 120 may have any alternate number of entries, such as 64 entries, 128 entries, 512 entries, or more. In some embodiments, each entry 302 of the ICT 120 corresponds to a respective instruction 124 in a 1:1 ratio. As shown, the ICT 120 has 256 entries for tracking up to 256 instructions that are in progress (or "in flight"). In some embodiments, the ICT 120 may be organized by the physical threads T0, T1, T2, T3, such that any logical mapping is performed elsewhere in the processor core 112. Continuing the example of the 256-entry ICT 120, when operating in a single thread mode the ICT 120 includes 256 entries available for 256 instructions of the single thread. In an SMT-2 mode, the ICT 120 includes 128 entries corresponding to 128 instructions of each thread. In an SMT-4 mode, the ICT 120 includes 64 entries corresponding to 64 instructions for each thread. For example, physical thread T0 may correspond to entries 302-0 through 302-63 (not shown), thread T1 may correspond to entries 302-64 through 302-127 (not shown), thread T2 may correspond to entries 302-128 through 302-191 (not shown), and thread T3 may correspond to entries 302-192 through 302-255. Other simultaneous multithreading modes and different numbers of entries for different threads are also possible. Further, in some embodiments, each instruction 124 included in the ICT 120 is assigned a unique instruction tag, and the ICT 120 is indexed by the instruction tags.

The ICT 120 includes execution distribution information 305 that indicates a portioning of individual instructions 124, as well as the execution units to which the portions have been dispatched or otherwise assigned. While four portions P1, P2, P3, P4 are shown, the dispatch unit of the processor may portion an instruction 124 into any other suitable number of portions. As shown in entry 302-0, a first instruction (instr 0) is not divided into multiple portions, and a first portion P1 of instr 0 is dispatched to execution unit EX1. A second instruction (instr 1) is divided into two portions: a first portion P1 dispatched to execution unit EX1 and a second portion P2 dispatched to execution unit EX2. A third instruction (instr 2) is divided into four portions: a first portion P1 dispatched to execution unit EX1, a second portion P2 dispatched to execution unit EX2, a third portion P3 dispatched to execution unit EX1, and a fourth portion P4 dispatched to execution unit EX3. A fourth instruction (instr 3) is not divided into multiple portions, and a first portion P1 of instr 3 is dispatched to execution unit EX4. A fifth instruction (instr 255) is not divided into multiple portions, and a first portion P1 of instr 255 is dispatched to execution unit EX2.

Each entry 302 includes corresponding finish information 310 that indicates whether portions P1, P2, P3, P4 of the instruction 124 have been executed. The ICT 120 updates the finish information 310 responsive to the finish reports 126 received from the various execution units. Within diagram 300, the finish information 310 for a particular instruction 124 comprises four finish bits, each finish bit corresponding to a respective portion of the instruction. As shown, the finish information 310 of entry 302-0 includes four logic "zero" values, where a zero value of the left-most finish bit indicates that execution of portion P1 is not yet finished. As there are not corresponding portions P2, P3, P4 for entry 302-0 (instr 0), the remaining three finish bits may be set to logic "zero" or logic "one". Alternately, the ICT 120 may designate a single finish bit where there is only a single portion P1 of the corresponding instruction 124, which may free memory of the processor for other uses. For entry 302-1 (instr 1), the values of finish bits are "0100", indicating that execution of portion P2 is finished but execution of portion P1 is not finished. For entry 302-2 (instr 2), the values of finish bits are "1111", indicating that execution of portions P1, P2, P3, and P4 is finished. For entry 302-3 (instr 3) and entry 302-255 (instr 255), the values of the finish bits are "1111", indicating that execution of corresponding portions P1 are finished. The finish information 310 may have any other suitable formatting.

The ICT 120 may further include information that is used to complete instructions and/or flush instructions. The ICT 120 may further include exception trouble code information (not shown) indicating whether the corresponding instruction 124 requires special handling. In some embodiments, each entry 302 includes a single exception trouble code bit, but other formats of the exception trouble code information 315 are also possible. As shown, entries 302-0, 302-2, and 302-255 have a logic zero value for the exception trouble code bit, indicating no special handling is required for the instruction 124. Entries 302-1 and 302-3 have a logic one value, indicating that special handling is required.

In some embodiments, each entry 302 of the ICT 120 includes additional information that indicates whether the corresponding instruction 124 is ready to complete. In some embodiments, each entry 302 includes a single bit representing a logical combination of the finish information 310 and/or exception trouble code information, but other formats are also possible. For example, the single bit for an entry 302 may be calculated by a logical multiplication of each of the finish bits (logical AND) and the inverse of the exception trouble code bit. Described another way, the single bit may be set to logic one (indicating the corresponding instruction 124 is in a ready to complete condition) when (1) the finish information 310 indicates that all of the portions of the instruction 124 have been executed and (2) the instruction 124 does not cause an exception that requires special handling. In other embodiments, the information indicating a readiness of an instruction 124 for completion may be based on one or more other predefined conditions.

The additional information for the different instructions 124 may be used by the processor to sequence the ready-to-complete instructions for completion. The additional information may be used by the processor to compute the next-to-complete (NTC) instruction. In some embodiments, the ICT 120 maintains a tail pointer for each thread T0, T1, T2, T3 to identify an oldest instruction therein. The ICT 120 may update the tail pointer(s) following completion (or flush) of one of the oldest instructions. The sequencing of instructions may be based on one or more additional factors, such as a designated prioritized instruction or thread, prioritizing a hung thread, and so forth. Using the additional information, the ICT 120 can have a variable rate of completion, such as 1 instruction per cycle up to 128 instructions per cycle or more. In some embodiments, the entire ICT 120 may be completed in a single cycle.

Referring to FIG. 1, in one example implementation, each execution unit 118 can support a 64-bit data flow. Other data flow sizes are also possible. If a particular instruction 124 requires 128 bits, a dispatch unit of the processor core 112 may dispatch portions of the instruction 124 to multiple execution units 118 for concurrent execution. Each of the multiple execution units 118 will return 64 bits of data.

In the case of a 128 bit vector scalar unit (VSU) instruction 124, the instruction 124 will be dispatched to two VSU slices for execution. Each of the VSU slices will send independent finish reports 126 to the ICT 120. The instruction 124 may be considered finished and ready to be completed after both finish bits are recorded in the ICT 120.

In the case of a 64 bit load store unit (LSU) instruction, the instruction 124 will be issued to the LSU. However, if the 64 bits issued to the LSU is unaligned, then the LSU instruction will be dispatched to 2 LSU slices. Each of the LSU slices will send independent finish reports 126 to the ICT 120. The instruction 124 may be considered finished and ready to be completed after both finish bits are recorded in the ICT 120.

In the case of a 128 bit LSU instruction, a single instruction 124 will be issued to two LSU slices for execution. However, if the 128 bits issued to the LSU is unaligned, then the LSU instruction will be sent to 3 LSU slices. Each of the LSU slices will send independent finish reports 126 to the ICT 120. The instruction 124 may be considered finished and ready to be completed after all three finish bits are recorded in the ICT 120.

In one example process having multiple finish bits per instruction 124, the ICT 120 will clear the finish bit(s) for an instruction 124 (e.g., set to a logic zero to indicate that the instruction 124 is not finished and therefore not ready to complete) when the instruction 124 is dispatched to an execution unit 118.

For instructions 124 that may be executed in a single execution unit 118 and only requiring a single finish report 126 to finish the instruction 124, the finish report 126 may include a single tag (index information for the ICT 120). Responsive to the finish report 126, the ICT 120 will set all of the finish bits 122 (e.g., set to a logic one to indicate the instruction 124 is finished). Upon determining that no special handling is required for the instruction 124 (or any other predefined conditions), the ICT 120 can update information to indicate that the instruction 124 is ready to be completed.

For 128 bit VSU instructions 124, each VSU slice (e.g., included in execution units 118) will send independent finish reports 126 and the ICT 120 will set each finish bit of the instruction 124 independently. Each VSU slice may send an identical tag to the ICT 120 to indicate that the finish report 126 is for the same ICT 120 location. When both finish bits are set to a logic one, the ICT 120 may be updated to indicate that the instruction is ready to be completed.

For aligned 64 bit LSU instructions, the LSU (e.g., included in execution units 118) will send a single finish report 126. The LSU may also send a mask to the ICT 120 to indicate that the data is aligned, and the ICT 120 will set all finish bits for this LSU instruction 124 to a logic one.

For unaligned 64 bit LSU instructions, two LSU slices (e.g., included in execution units 118) will send two finish reports 126 and the ICT 120 will set each finish bit of the instruction independently. Each LSU slice may send an identical tag to the ICT 120 to indicate that the finish report 126 is for the same ICT 120 location. When both finish bits are set to a logic one, the ICT 120 may be updated to indicate that the instruction is ready to be completed.

For unaligned 64 bit LSU instructions, three LSU slices (e.g., included in execution units 118) will send three finish reports 126 and the ICT 120 will set each finish bit of the instruction independently. Each LSU slice may send an identical tag to the ICT 120 to indicate that the finish report 126 is for the same ICT 120 location. When all of the finish bits are set to a logic one, the ICT 120 may be updated to indicate that the instruction is ready to be completed.

Figure 4:
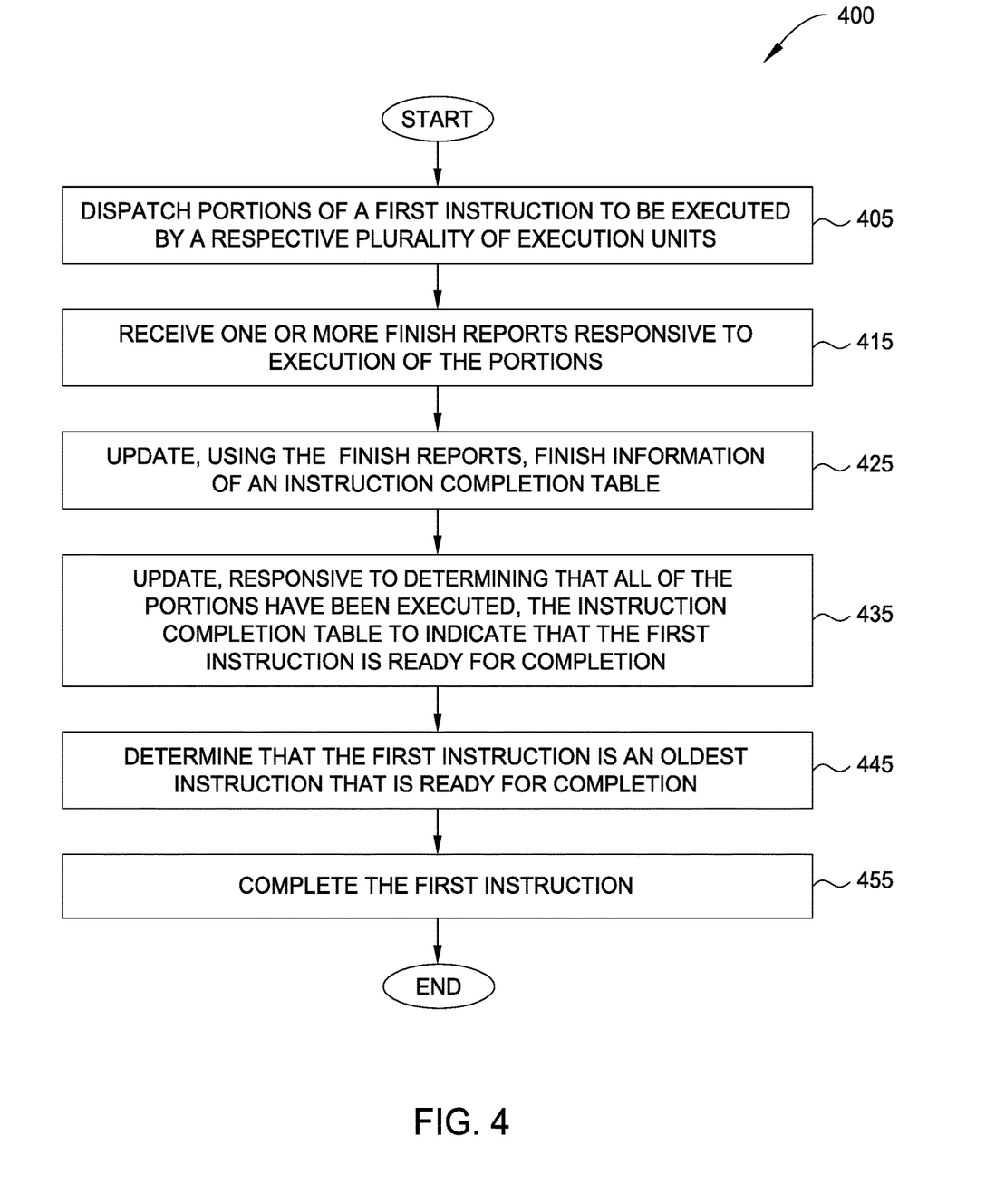
FIG. 4 is an exemplary method of operating a processor, according to embodiments described herein.

FIG. 4 is an exemplary method 400 of operating a processor, according to embodiments described herein. The method 400 may be performed in conjunction with other embodiments, such as the SMT processor 102 of FIG. 1. Method 400 begins at block 405, where the processor dispatches portions of a first instruction to be executed by a respective plurality of execution units. The first instruction may correspond to a first thread of a plurality of threads of the processor.

At block 415, the processor receives one or more finish reports responsive to execution of the portions. At block 425, the processor uses the finish report to update finish information of an instruction completion table.

At block 435, the processor updates, responsive to determining that all of the portions have been executed, the instruction completion table to indicate that the first instruction is ready for completion.

At block 445, the processor determines that the first instruction is an oldest instruction that is ready for completion. At block 455, the processor completes the first instruction. Method 400 ends following completion of block 455.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method of operating a processor, the method comprising:
    dispatching a plurality of portions of a first instruction for execution by a plurality of execution units of the processor, wherein the first instruction is of a plurality of instructions corresponding to a plurality of threads;
    assigning an instruction tag to the first instruction, wherein the processor includes an instruction complete table indexed by instruction tag, the instruction completion table comprising (i) a plurality of finish bits associated with the instruction tag assigned to the first instruction and (ii) execution distribution information specifying, for each of the plurality of portions of the first instruction, a respective one, of the plurality of execution units, that the respective portion is assigned to;
    upon execution of each portion of the plurality of portions by the respective one of the plurality of execution units, independently generating, by the respective execution unit, a respective finish report of a plurality of finish reports, each finish report specifying the instruction tag assigned to the first instruction;
    setting the plurality of finish bits of the instruction completion table based on the plurality of finish reports, wherein each finish bit is set independently responsive to a respective one of the plurality of finish reports;
    upon determining, based on the instruction completion table, that all of the portions of the first instruction have been executed, updating the instruction completion table to indicate that the first instruction is ready for completion; and
    completing the first instruction upon determining that the first instruction is an oldest instruction, of the plurality of instructions, that is ready for completion.

2. The method of claim 1, wherein the processor is a simultaneous multithreading processor configured to execute a plurality of threads corresponding to a plurality of instructions, wherein the instruction completion table is configured to track a status of the plurality of instructions during out-of-order processing, the method further comprising:
    selecting a first thread of the plurality of threads according to a predefined scheme, wherein the first thread includes the first instruction.

3. The method of claim 2, further comprising:
    for each of the plurality of threads, maintaining a respective tail pointer that points to an oldest instruction of the respective thread.

4. The method of claim 1, wherein dispatching portions of the first instruction comprises:
    clearing the plurality of finish bits of instruction completion table.

5. The method of claim 1, wherein updating the instruction completion table to indicate that the first instruction is ready for completion is further responsive to exception trouble code information of the instruction completion table, wherein the exception trouble code information has a predefined association with the first instruction.

6. The method of claim 5, wherein dispatching portions of the first instruction further comprises updating the exception trouble code information.

7. A simultaneous multithreading processor for executing a plurality of threads corresponding to a plurality of instructions, the simultaneous multithreading processor comprising:
    a dispatch unit configured to dispatch a plurality of portions of a first instruction for execution by a plurality of execution units, the first instruction selected from the plurality of instructions;
    an issue unit having an instruction tag component configured to assign an instruction tag to the first instruction;
    the plurality of execution units, each execution unit of which is configured to, upon execution of a respective portion, of the plurality of portions, assigned to the respective execution unit, independently generate a respective finish report of a plurality of finish reports, each finish report specifying the instruction tag that the first instruction is assigned to; and an instruction completion table for tracking a status of the plurality of instructions during out-of-order processing, wherein the instruction complete table is indexed by instruction tag and comprises (i) a plurality of finish bits associated with the instruction tag assigned to the first instruction and (ii) execution distribution information specifying, for each of the plurality of portions of the first instruction, the respective execution unit assigned to the respective portion, wherein the instruction completion table is configured to:

set the plurality of finish bits of the instruction completion table based on the plurality of finish reports, wherein each finish bit is set independently responsive to a respective one of the plurality of finish reports;

upon determining, based on the instruction completion table, that all of the portions of the first instruction have been executed, update the instruction completion table to indicate that the first instruction is ready for completion; and determine that the first instruction is an oldest instruction, of the plurality of instructions, that is ready for completion, whereafter the first instruction is completed.

8. The simultaneous multithreading processor of claim 7, wherein the instruction completion table is further configured to:

responsive to the dispatch unit dispatching portions of the first instruction, clear the plurality of finish bits of the instruction completion table.

9. The simultaneous multithreading processor of claim 7, wherein the instruction completion table further comprises exception trouble code information indicating whether the first instruction requires special handling, and wherein updating the instruction completion table to indicate that the first instruction is ready for completion is further responsive to the exception trouble code information.

10. The simultaneous multithreading processor of claim 9, wherein the instruction completion table is further configured to:

responsive to the dispatch unit dispatching portions of the first instruction, update the exception trouble code information.

11. The simultaneous multithreading processor of claim 7, wherein the instruction completion table is further configured to:

for each of the plurality of threads, maintaining a respective tail pointer that points to an oldest instruction of the respective thread.

12. The simultaneous multithreading processor of claim 7, wherein the instruction completion table comprises a plurality of entries corresponding to the plurality of instructions, and wherein the plurality of entries are organized by which thread of the plurality of threads the plurality of instructions correspond to.

13. A method of operating a processor comprising a plurality of execution units, the method comprising:

assigning an instruction tag to the first instruction of a plurality of instructions corresponding to a plurality of threads, wherein a plurality of portions of the first instruction is dispatched for execution by the plurality of execution units, wherein the processor includes an instruction complete table indexed by instruction tag, the instruction completion table comprising (i) a plurality of finish bits associated with the instruction tag assigned to the first instruction and (ii) execution distribution information specifying, for each of the plurality of portions of the first instruction, a respective one, of the plurality of execution units, that the respective portion is assigned to;

upon execution of each portion of the plurality of portions by the respective execution unit, independently generating, by the respective execution unit, a respective finish report of a plurality of finish reports, each finish report specifying the instruction tag assigned to the first instruction;

updating finish information of the instruction completion table based on the plurality of finish reports, the finish information corresponding to one or more instructions of the plurality of instructions; and responsive to updating the finish information, updating the instruction completion table to indicate at least a first instruction as being the oldest instruction, of the plurality of instructions, that is ready for completion, whereafter the first instruction is completed.

14. The method of claim 13, wherein updating the instruction completion table to indicate that the first instruction is ready for completion is further responsive to exception trouble code information of the instruction completion table, wherein the exception trouble code information has a predefined association with the first instruction.

15. The method of claim 13, wherein the processor is a simultaneous multithreading processor configured to execute the plurality of threads, the method further comprising:

for each of the plurality of threads, maintaining a respective tail pointer that points to an oldest instruction of the respective thread.

16. The method of claim 1, wherein the instruction tag uniquely identifies the first instruction, wherein each finish report is sent to a logic component of the instruction completion table, wherein each finish bit is set by the logic component upon receiving a respective finish report, wherein the method further comprises, for each of the plurality of threads, maintaining a respective tail pointer that points to an oldest instruction of the respective thread, wherein that the first instruction is the oldest instruction is determined based on accessing the tail pointers of the plurality of threads, wherein each of the plurality of threads comprises a different thread, wherein the instruction completion table includes, for each of the plurality of threads, a different number of entries for the respective thread.

17. The method of claim 16, wherein the instruction completion table further comprises (iii) an exception-trouble-code bit and (iv) a ready-to-complete bit, wherein the ready-to-complete bit is calculated by a logical multiplication of (A) each of the plurality of finish bits and (B) an inverse of the exception-trouble-code bit, wherein the ready-to-complete bit is used in (i) computing a next-to-complete instruction and (ii) sequencing ready-to-complete instructions for completion.

18. The simultaneous multithreading processor of claim 7, wherein the instruction tag uniquely identifies the first instruction, wherein each finish report is sent to a logic component of the instruction completion table, wherein each finish bit is set by the logic component upon receiving a respective finish report, wherein that the first instruction is the oldest instruction is determined based on accessing tail pointers of the plurality of threads.

19. The simultaneous multithreading processor of claim 7, wherein the instruction completion table is further configured to:
  for each of the plurality of threads, maintain a respective tail pointer that points to an oldest instruction of the respective thread.

20. The method of claim 13, wherein the instruction tag uniquely identifies the first instruction, wherein each finish report is sent to a logic component of the instruction completion table, wherein the finish information is updated by the logic component upon receiving the respective finish report, wherein the first instruction is determined as being the oldest instruction based on accessing tail pointers of the plurality of threads.

* * * * *